Patented Feb. 6, 1951

2,540,788

UNITED STATES PATENT OFFICE 2,540,788

PROCESS FOR THE PRODUCTION OF BENZONITRILE

Frank A. Klimitas, Pitman, and Herbert E. Rasmussen, Woodbury, N. J., assignors to Socony-Vacuum Oil Company, Incorporated, a corporation of New York No Drawing. Application October 1, 1949, Serial No. 119,216

2 Claims. (Cl. 260—465)

This invention relates, broadly, to a process for producing benzonitrile and is more particularly concerned with a catalytic process for the production of benzonitrile from toluene and ammonia.

In accordance with the process disclosed and claimed in U. S. Patent No. 2,450,632, benzonitrile is produced by reacting toluene with ammonia, in the vapor phase and at elevated temperatures, and in the presence of a catalytic material containing molybdenum oxide. In accordance with this process, it is essential to use a catalyst containing molybdenum oxide.

It has now been discovered that in the process otherwise disclosed in the aforementioned patent, it is possible to obtain commercially feasible conversions per pass of benzonitrile, in the absence of catalysts containing molybdenum oxide. It has been found that the use of air in conjunction with cracking catalysts of the silica-alumina type in the reaction between toluene and ammonia produces benzonitrile. In view of the relatively low cost of the cracking catalysts, the commercial advantages of such a process over the process utilizing a molybdenum oxide catalyst are manifest.

Accordingly, it is an object of the present invention to provide a process for the production of benzonitrile. An important object is to provide a catalytic process for the production of benzonitrile which is inexpensive and commercially feasible. A specific object is to provide commercially feasible conversions per pass and ultimate yields of benzonitrile in a catalytic process which comprises reacting toluene with ammonia, in the vapor phase, at elevated temperatures, and in the presence of air and a cracking catalyst of the silica-alumina type. Other objects and advantages of the present invention will become apparent to those skilled in the art from the following description.

Broadly stated, the present invention provides a process for the production of benzonitrile, which comprises contacting toluene with ammonia, in the vapor phase, at temperatures varying between about 875° F. and the decomposition temperature of ammonia, in the presence of a cracking catalyst of the silica-alumina type, and in the presence of air in amounts upwards of about 15 per cent by weight, based on the weight of the toluene.

The ratio of ammonia to toluene in the charge may vary over a wide range with little effect on the ultimate yield of benzonitrile. In general, the reaction mixture may contain as little as 2 mol per cent or as much as 98 mol per cent of toluene. Ordinarily, however, it is preferred to use charges containing between about 20 mol per cent and about 90 mol per cent of toluene.

In accordance with the present invention, air is added to the reaction zone directly, or it may be charged in admixture with one or both of the reactants. In practice, it is preferred to charge the air in admixture with the reactants. Air in amounts as small as 15 per cent, based on the weight of the toluene, produces the results contemplated herein. Ordinarily, however, air in amounts varying between about 30 per cent and about 75 per cent, based on the weight of the toluene, produces the most satisfactory results. It is to be understood, however, that air may be used in amounts greater than about 75 per cent of the weight of the toluene, it being within the skill of one versed in the art to determine the optimum amount of air to be used in any specific operation.

The catalysts operative to produce benzonitrile by reacting toluene with ammonia, in the process of the present invention, are those described in U. S. Patent No. 2,384,946. These "bead" cracking catalysts are hard, homogeneous, porous and dried inorganic oxide gel particles containing silica and alumina. They are prepared by initially forming a hydrosol of inorganic oxide including silica and alumina. The hydrosol is then introduced, in the form of separate globules, into a fluid medium which is substantially immiscible with water and which is kept at a temperature below the boiling point of the hydrosol, whereby the globules assume a spheroidal shape. The globules are kept in this medium for a period of time sufficient to effect gelation. The resulting gel spheroids are then washed with water to remove water-soluble salts, are subsequently base exchanged with a solution containing a cation capable of replacing alkali metals, and, finally, are dried. For the purpose of the present invention, the $SiO_2:Al_2O_3$ weight ratio in the finished beads should fall within the range varying between about 20:1 and about 6:1.

By way of a non-limiting example, in practice, the foregoing is effected by initially mixing aqueous solutions of sodium silicate and of aluminum sulfate, in suitable proportions to produce the desired $SiO_2:Al_2O_3$ weight ratio in the final product. The resulting hydrosol is then introduced through orifices into the top of an 8-foot column of gas oil maintained at room temperature (68° F.). The globules of hydrosol fall through the oil and gel before passing into a layer of water located beneath the oil. The gel spheroids are carried from the bottom of the column by a stream of water and on removal from the water, are washed with petroleum naphtha to remove oil from their surfaces. The spheroids are then first washed with water and subsequently with an aqueous solution of ammonium chloride to replace zeolitically-held sodium ions with ammonium ions. The latter can be driven off as ammonia gas by heat. The spheroids are then dried slowly and uniformly at 180° F. until shrinkage is substantially complete. Drying is then continued at a gradually increasing temperature up to about 1050° F. at which temperature, the spheroids are maintained for about two hours.

In operation, the catalyst becomes fouled with carbonaceous material which ultimately affects the catalytic activity. Accordingly, when the efficiency of the catalyst declines to a point where further operation becomes uneconomical or disadvantageous from a practical standpoint, the catalyst may be regenerated, as is well known in the art, by subjecting the same to a careful oxidation treatment, for example, by passing a stream of air or air diluted with flue gases or steam over the same, under appropriate temperature conditions and for a suitable period of time, such as the same period of time as the duration of the catalytic operation. Preferably, the oxidation treatment is followed by a purging treatment, such as passing over the catalyst a stream of purge gas, for example, steam, nitrogen, carbon dioxide, hydrocarbon gases, etc.

The reaction or contact time, i. e., the period of time during which a unit volume of the reactants is in contact with a unit volume of catalyst, may vary between a fraction of a second and several minutes. Thus, the contact time may be as low as 0.01 second and as high as 20 minutes. It is preferred to use contact times varying between 0.1 second and one minute, particularly, between 0.3 second and 30 seconds. It must be realized that at best these figures are estimates based on the number of assumptions. For all practical purposes, as in catalytic processes of the type of the present invention, the more reliable data on contact time is best expressed, as is well known in the art, in terms of liquid space velocities, in the present instance, the volume of toluene per volume of catalyst per hour. Accordingly, it has been found that the space velocities may be varied considerably and that velocities varying between about one-fourth and about four are quite satisfactory for the purposes contemplated herein.

In general, the temperatures to be used in the process of the present invention vary between about 875° F. and the decomposition temperature of ammonia (about 1250–1300° F.), and, preferably, between about 900° F. and about 1075° F. The preferred temperature to be used in any particular operation will depend upon the type of catalyst employed. Generally speaking, the higher temperatures increases the conversion per pass, but they also decrease the ultimate yields of benzonitrile by increasing the decomposition of the reactants. Accordingly, the criteria for determining the optimum temperature to be used in any particular operation will be based on the type of catalyst and a consideration of commercial feasibility from the standpoint of striking a practical balance between conversion per pass and losses to decomposition.

The process of the present invention may be carried out at subatmospheric, atmospheric or superatmospheric pressures. Superatmospheric pressures are advantageous in that unreacted charge materials condense more readily. Subatmospheric pressures appear to favor the reactions involved, since the reaction products have a larger volume than the reactants, and hence, it is evident from the Le Chatelier-Braun principle that the equilibrium favors nitrile formation more at reduced pressures. However, such pressures reduce the throughput of the reactants and present increased difficulties in recycling unreacted charge materials. Therefore, atmospheric or superatmospheric pressures are preferred.

The present process may be carried out by making use of any of the well-known techniques for operating catalytic reactions in the vapor phase effectively. By way of illustration, toluene and ammonia may be vaporized separately in preheating zone. The vaporized reactants are then introduced, in suitable proportions, together with suitable proportions of air, into a reaction zone containing a catalyst of the type defined hereinbefore. The reaction zone may be a chamber of any suitable type useful in contact-catalytic operations; for example, a catalyst bed contained in a shell or a shell through which the catalyst flows concurrently, or countercurrently, with the reactants. The vapors of the reactants are maintained in contact with the catalyst at a predetermined elevated temperature and for a predetermined period of time, both as set forth hereinbefore, and the resulting reaction mixture is passed through a condensing zone into a receiving chamber. It will be understood that when the catalyst flows concurrently, or countercurrently, with the reactants in a reaction chamber, the catalyst will be thereafter suitably separated from the reaction mixture by disengaging baffles, etc. The reaction mixture will be, predominantly, a mixture of benzonitrile, hydrogen, unchanged toluene, unchanged ammonia, and air. The benzonitrile and the unchanged toluene will be condensed in passing through the condensing zone and will be retained in the receiving chamber. Benzonitrile can be separated from the unchanged toluene by any of the numerous and well-known separation procedures, such as fractional distillation. Similarly, the uncondensed hydrogen and unchanged ammonia can be separated from each other by absorbing ammonia in a suitable medium and then recovering it. The unchanged toluene and ammonia can be recycled to the process, with or without the addition of fresh toluene or ammonia, or both.

It will be apparent that the process may be operated as a batch or discontinuous process as by using a catalyst-bed-type reaction chamber in which the catalytic and regeneration operations alternate. With a series of such reaction chambers, it will be seen that as the catalytic operation is taking place in one or more of the reaction chambers, regeneration of the catalyst will be taking place in one or more of the other reaction chambers. Correspondingly, the process may be continuous when one or more catalyst chambers are used through which the catalyst flows in contact with the reactants. In such a continuous process, the catalyst will flow through the reaction zone in contact with the reactants and will thereafter be separated from the reaction mixture as, for example, in a disengaging zone, before condensing the reaction mixture. In a continuous process, therefore, the catalyst—fresh or regenerated—and the reactants—fresh or recycled—will flow continuously through a reaction chamber.

The following specific examples are for the purpose of illustrating the mode of preparing benzonitrile in accordance with the process of the present invention, and for the purpose of demonstrating the advantages thereof. It is to be clearly understood that the invention is not to be limited to the specific catalyst disclosed hereinafter, or to the conditions and manipulations set forth in the examples.

EXAMPLES 1 TO 3

The reaction system included a reactor containing 100 parts by weight of bead catalyst; preheating zones; a condensing zone; a receiving chamber; and gas separators and scrubbers. The catalyst used was a conventional bead cracking catalyst, prepared by the method set forth hereinbefore and containing silica and alumina in a weight ratio of 8:1, respectively. In each of the runs, toluene and ammonia were preheated separately in the preheating zones. The reactants were continuously charged, in the vapor phase, into the reactor in an ammonia-toluene mol ratio varying between about one and about 1.3, at such a rate that the liquid space velocity was about 2.0. During this operation, air, when used, was introduced into the toluene stream passing into the preheater. The reaction mixture passed from the reactor, through the condensing zone, into a receiving chamber. The unchanged ammonia, light gases and hydrogen were sent to the gas separators and scrubbers where they were continuously scrubbed with water. The hydrogen and light gases were metered and vented. The ammonia was discarded. The benzonitrile and unchanged toluene were separated by distillation; the benzonitrile was drawn off and the toluene was recycled to the toluene preheater.

The pertinent data and the results of each run are tabulated in Table I.

*Table I*

| Run No. | Temperature, °F. | Air, Liters per Minute | Conversion per Pass. Grams of Benzonitrile per 100 Grams of Toluene Charged |
|---|---|---|---|
| 1 | 980 | None | Nil |
| 2 | 980 | 1.3 | 4.0 |
| 3 | 1,100 | 1.3 | 3.4 |

It will be apparent from the foregoing that the present process provides an efficient, inexpensive, and safe process for obtaining benzonitrile. The process is of considerable value in making commercially available relatively inexpensive benzonitrile which is useful, for example, as an intermediate in organic synthesis, resin manufacture, etc.

Although the present invention has been described with preferred embodiments, it is to be understood that modifications and variations may be resorted to without departing from the spirit and scope of this invention, as those skilled in the art will readily understand. Such variations and modifications are considered to be within the purview and scope of the appended claims.

What is claimed is:

1. The process for producing benzonitrile, which comprises contacting toluene with ammonia, in the gaseous phase, at a temperature varying between about 875° F. and about 1250° F., and in the presence of air in amounts of at least about 15 per cent based on the weight of said toluene and of a catalyst consisting essentially of hard, homogeneous, porous and dried inorganic oxide gel particles containing silica and alumina in a weight ratio varying between about 20:1 and about 6:1, respectively, said gel particles being formed by forming a hydrosol of inorganic oxide including silica and alumina, introducing said hydrosol in the form of separate globules into a fluid medium which is substantially immiscible with water and which is kept at a temperature below the boiling point of the hydrosol, whereby the globules assume a spheroidal shape, maintaining said globules in said medium for a period of time sufficient to effect gelation to produce gel spheroids, washing said gel spheroids with water to remove water-soluble salts, base exchanging said gel spheroids with a solution containing a cation capable of replacing alkali metals, and drying the washed and base exchanged spheroids.

2. The process for producing benzonitrile, which comprises contacting toluene with ammonia, in the gaseous phase, at a temperature varying between about 900° F. and about 1075° F., and in the presence of air in amounts varying between about 30 per cent and about 75 per cent based on the weight of said toluene and of a catalyst consisting essentially of hard, homogeneous, porous and dried inorganic oxide gel particles containing silica and alumina in a weight ratio varying between about 20:1 and about 6:1, respectively, said gel particles being formed by forming a hydrosol of inorganic oxide including silica and alumina, introducing said hydrosol in the form of separate globules into a fluid medium which is substantially immiscible with water and which is kept at a temperature below the boiling point of the hydrosol, whereby the globules assume a spheroidal shape, maintaining said globules in said medium for a period of time sufficient to effect gelation to produce gel spheroids, washing said gel spheroids with water to remove water-soluble salts, base exchanging said gel spheroids with a solution containing a cation capable of replacing alkali metals, and drying the washed and base exchanged spheroids.

FRANK A. KLIMITAS.
HERBERT E. RASMUSSEN.

REFERENCES CITED

The following references are of record in the file of this patent:

UNITED STATES PATENTS

| Number | Name | Date |
|---|---|---|
| 2,499,055 | Cosby et al. | Feb. 28, 1950 |

OTHER REFERENCES

Berkman et al.: "Catalysis" (Reinhold) pp. 782, 801, 803, 804 (1940).